United States Patent
Gargi

(10) Patent No.: US 8,472,791 B2
(45) Date of Patent: Jun. 25, 2013

(54) VARIABLE SPEED VIDEO PLAYBACK

(75) Inventor: Ullas Gargi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1762 days.

(21) Appl. No.: 10/803,252

(22) Filed: Mar. 17, 2004

(65) Prior Publication Data

US 2005/0207733 A1    Sep. 22, 2005

(51) Int. Cl.
*H04N 5/783* (2006.01)
*H04N 9/80* (2006.01)

(52) U.S. Cl.
USPC .......................... 386/343; 386/239; 386/248

(58) Field of Classification Search
USPC ............. 386/68, 239–262, 343–352; 715/720
See application file for complete search history.

(56) References Cited

U.S. PATENT DOCUMENTS

| | | | | |
|---|---|---|---|---|
| 6,144,964 | A * | 11/2000 | Breese et al. | 707/10 |
| 6,907,570 | B2 * | 6/2005 | Amir et al. | 715/720 |
| 7,152,209 | B2 * | 12/2006 | Jojic et al. | 715/720 |
| 2002/0086269 | A1 * | 7/2002 | Shpiro | 434/156 |

OTHER PUBLICATIONS

Foote, et al., "An Intelligent Media Browser Using Automatic Multimodal Analysis," 1998, http://www.acm.org/sigs/sigmm/MM98/electronic_proceedings/foote/.
Wittenburg, et al., "Rapid Serial Visual Presentation Techniques for Consumer Digital Video Devices," Aug. 2003, http://www.merl.com/papers/TR2003-19/.
Srinivasan, et al., "'What is in that Video anyway?': In Search of Better Browsing," IEEE 1999, pp. 388-393.

* cited by examiner

*Primary Examiner* — Hung Dang

(57) ABSTRACT

An exemplary method for variable speed video playback comprises obtaining a set of scores for a plurality of discrete segments in a digital video, enabling a playback of the digital video at a variable playback speed that may change from segment to segment based on the set of scores, receiving a user input to adjust the playback speed for at least one of the segments by modifying at least one of the set of scores, and adjusting the variable playback speed based on the user input.

39 Claims, 6 Drawing Sheets

VARIABLE SPEED VIDEO PLAYBACK

BACKGROUND

Digital videos are generally accessed in a sequential or linear fashion (e.g., one frame after another). As a result, browsing digital videos can be more inefficient than browsing some other types of digital content (e.g., text documents). Many techniques have been developed to provide an improved browsing experience for digital videos.

For example, video analysis algorithms have been developed for detecting certain features within frames of a digital video. The typical features detectable include speech detection, image/face detection, motion detection, laughter detection, etc. The detected feature(s) can be used to extract certain relatively more interesting frames. The extracted frames are usually presented in chronological order to a user and may be combined with other information (e.g., audio, closed-caption, etc.) into a more meaningful summary of the digital video (e.g., a still or motion storyboard).

A score (or other value) may be explicitly or implicitly assigned to one or more frames of a digital video when certain features are detected (or are absent). For example, whenever motion is detected in a frame, that frame may be assigned a score of "1." Conversely, if no motion is detected in a frame, that frame may be assigned a score of "0." Such assigned scores may be used to enable variable speed playback of the digital video. For example, frames having less motion (as indicated by a lower score) may be played at a faster rate and frames having more motion (as indicated by a higher score) may be played at a slower rate. Thus, it is possible for a video system to be configured to automatically adjust its playback speed, as a function of time, such that the user is given more time to view frames depicting greater levels of activity, while spending less time on frames depicting lower levels of activity.

However, existing techniques do not allow a user to dynamically change the scores assigned to the frames of the digital video to dynamically change the playback speed. The user can only view the video at the variable playback speed determined by the system.

Thus, a market exists for an improved digital video playback technique in which the playback speed may be varied by dynamically adjusting scores assigned to portions of the digital video.

SUMMARY

An exemplary method for variable speed video playback comprises obtaining a set of scores for a plurality of discrete segments in a digital video, enabling a playback of the digital video at a variable playback speed that may change from segment to segment based on the set of scores, receiving a user input to adjust the playback speed for at least one of the segments by modifying at least one of the set of scores, and adjusting the variable playback speed based on the user input.

An exemplary system for enabling variable speed video playback comprises a video playback module and a user interface module. The video playback module is configured to receive a set of scores for a plurality of discrete segments in a digital video, enable a playback of the digital video at a variable playback speed that may change from segment to segment based on the set of scores, receive a user input to adjust the playback speed for at least one of the segments by modifying at least one of the set of scores, and adjust the variable playback speed based on the user input. The user interface module is configured to provide the user input to the video playback module.

Other embodiments and implementations are also described below.

DETAILED DESCRIPTION

I. Overview

Exemplary improved techniques for playback of a digital video are described herein.

Section II describes an exemplary system for providing variable speed playback.

Section III describes an exemplary process for generating a digital signal representing scores for discrete segments of a digital video.

Section IV describes an exemplary process for providing a variable speed playback of a digital video.

Section V describes an exemplary process for changing a variable playback speed in response to a user input.

Section VI describes other aspects and considerations.

Section VII describes an exemplary computing environment.

II. An Exemplary System

Figure 1:
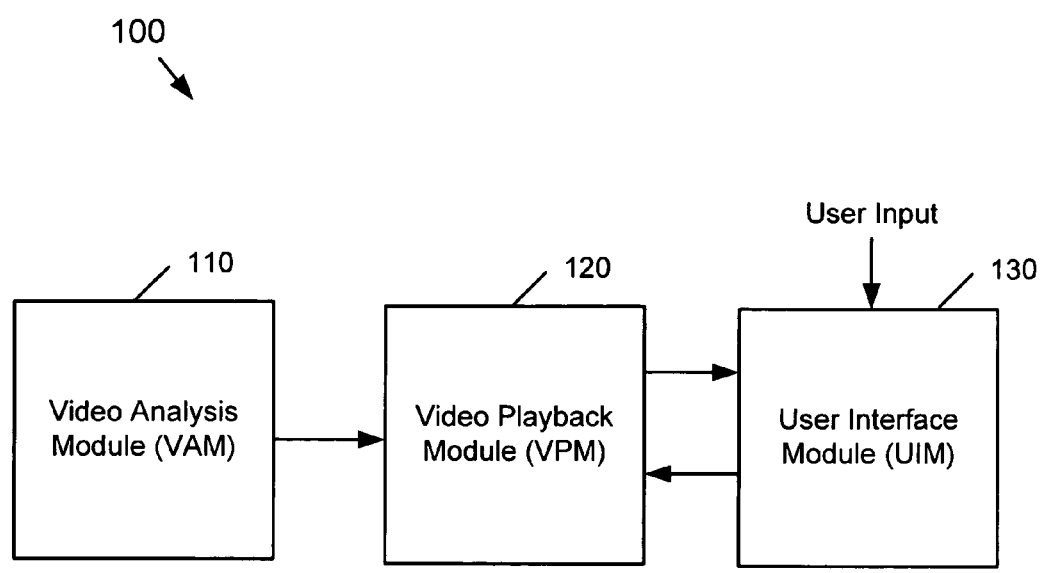
FIG. 1 illustrates an exemplary system for providing variable speed playback of digital videos.

FIG. 1 illustrates an exemplary system 100 for providing variable speed video playback. The system 100 includes a video analysis module (VAM) 110, a video playback module (VPM) 120, and a user interface module (UIM) 130. One or more modules 110-130 may reside in the same computing device or in different devices coupled to each other or in a distributed computing environment. One or more modules 110-130 may be connected to a network, such as a local-area-network (LAN) (e.g., an intranet) and/or a wide-area-network (WAN) (e.g., the Internet).

A. The Video Analysis Module (VAM)

In general, the VAM 110 analyzes digital videos and generates one or more digital signals representing scores assigned to discrete segments (e.g., frames) of the digital videos. The generated digital signals may be used by the VPM 120 to provide variable speed playback of the digital videos to a user. For ease of explanation, in various exemplary implementations described herein, a discrete segment of a digital video will be referred to as a frame of the digital video. However, a discrete segment is not limited to a frame. Rather, it can comprise any length or portion of the digital video (including multiple frames, or a portion of a single frame) and multiple discrete segments of a digital video do not have to be of the same duration.

In an exemplary implementation, the VAM 110 implements video analysis techniques known in the art to determine the scores to be assigned to each discrete segment of a digital video. Exemplary video analysis techniques include, without limitation, speech detection, image/face detection, motion detection, laughter detection, etc. By way of illustration, if a discrete segment of a digital video is a frame of the digital video, an incremental score of +1 may be assigned to the frame if speech is detected in the frame and an incremental score of 0 may be assigned if no speech is detected in the frame. Similarly, if laughter is detected in the frame, an incremental score of +1 may be assigned to the frame and an incremental score of 0 may be assigned to the frame if no laughter is detected. After all applicable video analysis techniques have been implemented (the type and number of video analysis techniques to be applied to a digital video are a matter of design choice), a final score for each frame may be determined. For example, the incremental scores assigned to a frame may be added to arrive at the final score for the frame. The final score may (optionally) be normalized to some standard range (for example, to range from 0 to 1) if desired. The final score of a frame may be used to determine how interesting the frame is relative to other frames of the digital video. Specifically, in an exemplary implementation, a higher final score represents a determination that there exist relatively more features of interest in the frame, while a lower final score represents a determination that there exist relatively fewer features of interest in the frame.

In another exemplary implementation, each video analysis technique may be given a different weight in the final score. For example, if speech is considered more important than other video features (e.g., laugher, motion, etc.) for a digital video, a larger multiplier may be used to augment the weight of the score assigned to each frame of the digital video when speech is detected. Likewise, if a video feature is considered less important, then a smaller multiplier may be used to decrease the weight of its video analysis technique.

Depending on design choice, the weight given to each type of video analysis technique may be assigned prior to performing an analysis of a digital video or at the end of an analysis of the digital video (or both). In the latter implementation, if a majority of frames of the video have the same incremental scores for a particular type of video analysis technique, that technique is relatively poor at differentiating among frames, and correspondingly less useful for determining whether a frame is relatively more interesting compared to other frames. A smaller weight then may be assigned to that video analysis technique so that the weight of the scores associated with that video analysis technique is reduced in the final scores. Conversely, a video analysis technique that strongly differentiates among frames may be given an increased weight. Based on the new weight given to that video analysis technique, a new set of final scores may be recalculated to reflect the change. Whether weight has been assigned prior to performing an analysis, weight may still be assigned or adjusted after the analysis is performed.

The VAM 110 may reside in a local computing device (i.e., physically near the VPM 120 and/or the output display to be used for user playback) or a remote computing device (i.e., connected by a network to the VPM 120). The VAM 110 may reside in a single computing device or multiple computing devices connected by a network or in a distributed computing environment. In an exemplary implementation, the computing device may include a processor capable of executing computer instructions from a memory accessible by the processor. In another exemplary embodiment, the VAM 110 may be an optional module so long as the VPM 120 can obtain digital signals from another source (e.g., a third party service provider).

B. The Video Playback Module (VPM)

The VPM 120 receives one or more digital signals associated with a digital video from the VAM 110. In general, the VPM 120 uses the digital signals to establish and provide a default variable speed playback configuration. For example, the playback speed may be increased when a discrete segment (e.g., a frame) of a digital video has a lower score, and conversely, the playback speed may be decreased (perhaps simply reverting to the normal playback speed) when a discrete segment of a digital video has a higher score.

In an exemplary implementation, the VPM 120 may be located in a set-top box, a video recorder, a TV, a DVD player, any Internet-enabled computing device (e.g., cell phone, PDA, etc.), and/or other remote or local computing devices capable of communication with (e.g., obtaining data from and/or providing data to) both the VAM 110 and the UIM 130. The VPM 120 may obtain digital signals from the VAM 110 at a convenient time prior to providing variable speed playback to a user. Further, digital videos to be played to a user may be pre-loaded or streamed to a location (e.g., internal or external memory) accessible by the VPM 120. In the latter implementation, portions of the digital video may be buffered in memory accessible by the VPM 120 prior to playback.

During playback, the VPM 120 may receive user input from the UIM 130 to change the default variable playback speed. In an exemplary implementation, the user may adjust on a frame-by-frame basis (e.g., for one or more frames currently being played) the final scores previously computed by the system. In this implementation, the VPM 120 recalculates the playback speed of those frames whose final scores have been adjusted. In another exemplary implementation, the user may change the weight of a video analysis technique being applied to the digital video. In this implementation, the VPM 120 recalculates the playback speed for one or more frames or even the entire digital video. An exemplary process for recalculating/adjusting the playback speed is described in more detail below in Section V. If the video is already being played, the VPM 120 may continue to play the video at the new variable speed or allow a user to restart playback of the entire video.

Methods for changing the default variable playback speed described above are merely illustrative. One skilled in the art will recognize that other methods may also be implemented in accordance with the requirements of a particular system and design choice.

Figure 2:
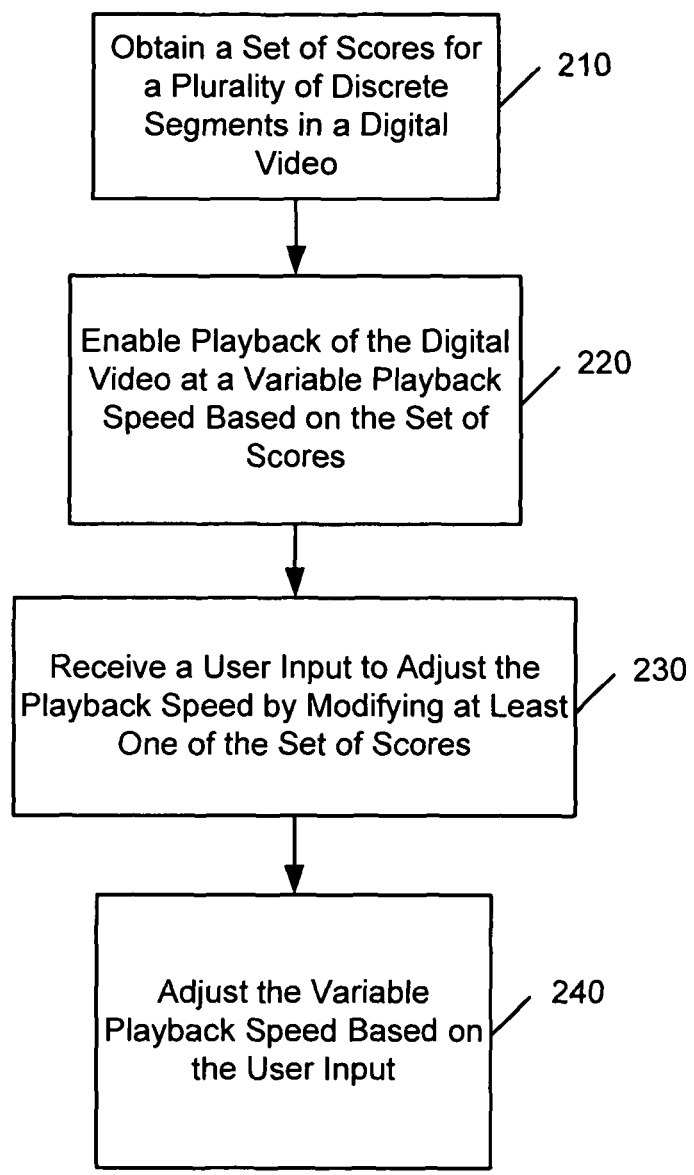
FIG. 2 illustrates an exemplary process for providing variable speed video

FIG. 2 illustrates an exemplary process performed by the VPM 120 for providing variable speed playback of a digital video.

At step 210 the VPM 120 obtains a set of scores for a plurality of discrete segments in a digital video.

At step 220, the VPM 120 enables a playback of the digital video at a variable playback speed that may change from segment to segment based on the set of scores.

At step 230, the VPM 120, receives a user input to adjust the playback speed for at least one of the segments by modifying at least one of the set of scores.

Figure 5:
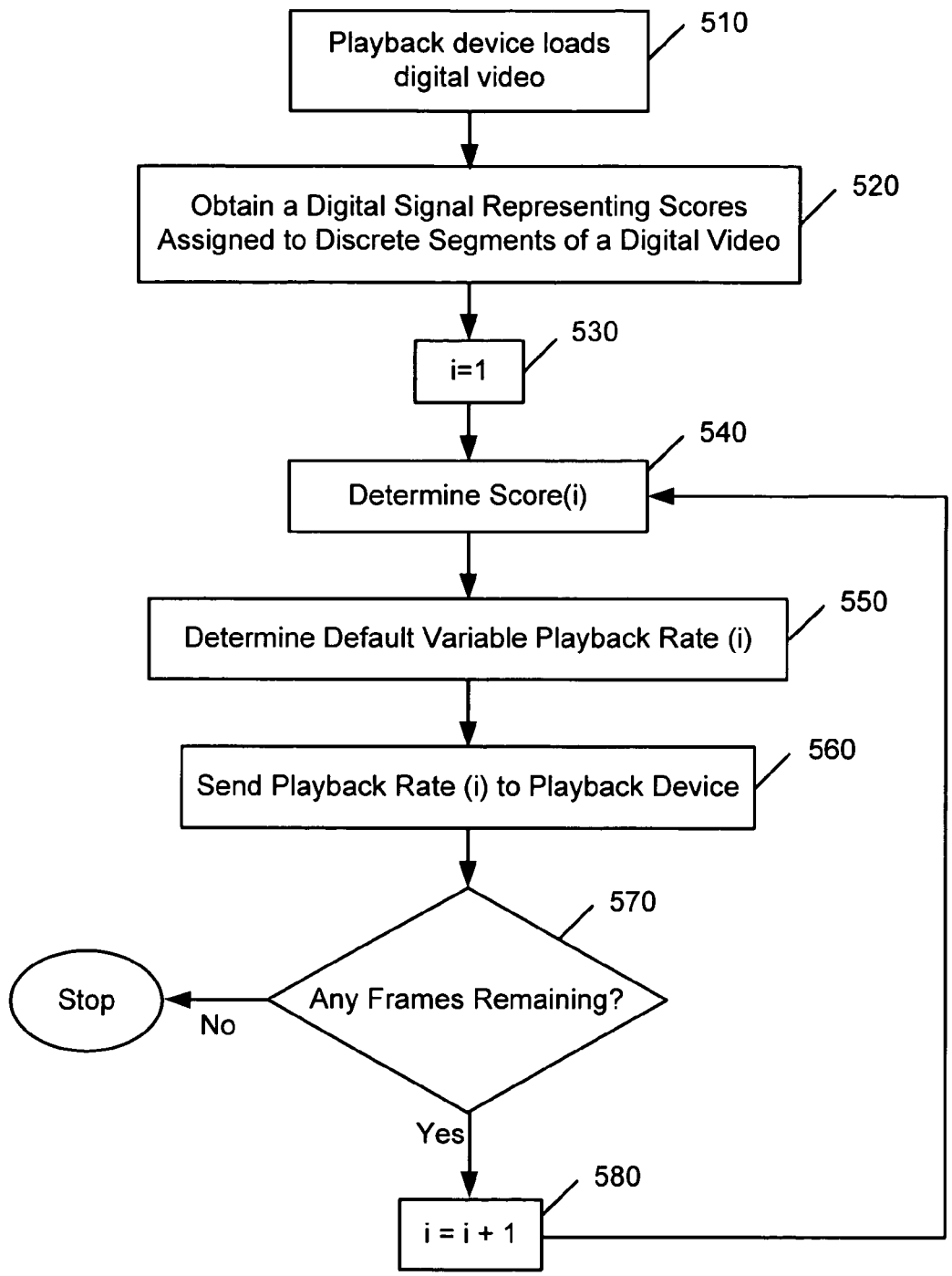
FIG. 5 illustrates an exemplary implementation of the process of FIG. 2.
Figure 6:
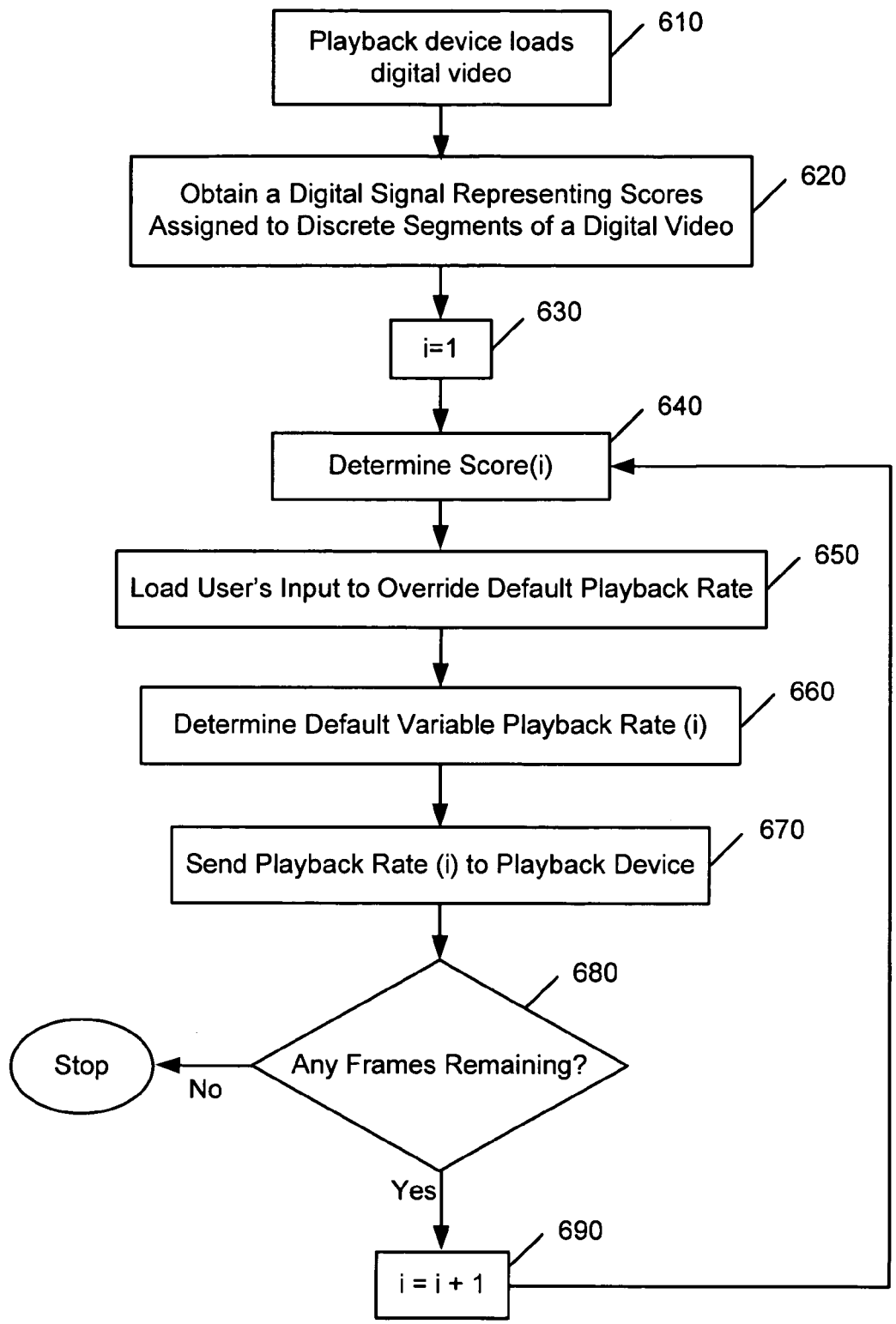
FIG. 6 illustrates another exemplary implementation of the process of FIG. 2.

At step 240, the VPM 120 adjusts the variable playback speed based on the user input. FIGS. 5 and 6 discussed in Sections IV and V below illustrate the exemplary process of FIG. 2 in more detail.

C. The User Interface Module (UIM)

The UIM 130 may be connected to an output device or may be a part of an output device for displaying digital videos being playback by the VPM 120 at a variable playback speed. In an exemplary implementation, the UIM 130 enables a user to dynamically change a default variable playback speed. For example, the user may change a default variable playback speed by modifying the final scores assigned to one or more frames and/or the weight being given to one or more video analysis techniques (i.e., motion, speech, laughter, face, etc.). In one implementation, the user's input may amplify or dampen the system's default determination of whether there exist features of interest. In another implementation, the user may change the default variable playback speed by setting a maximum or average playback speed. In this implementation, the user determined maximum or average playback speed may affect the playback speed of one or more discrete segments or even the entire digital video. The user may perform these and other changes either dynamically during playback or prior to playback, or both. In an exemplary implementation, visible graphics provided on the display screen may be implemented to receive user input. For example, one or more slide bars may be displayed on a display screen.

Figure 3:
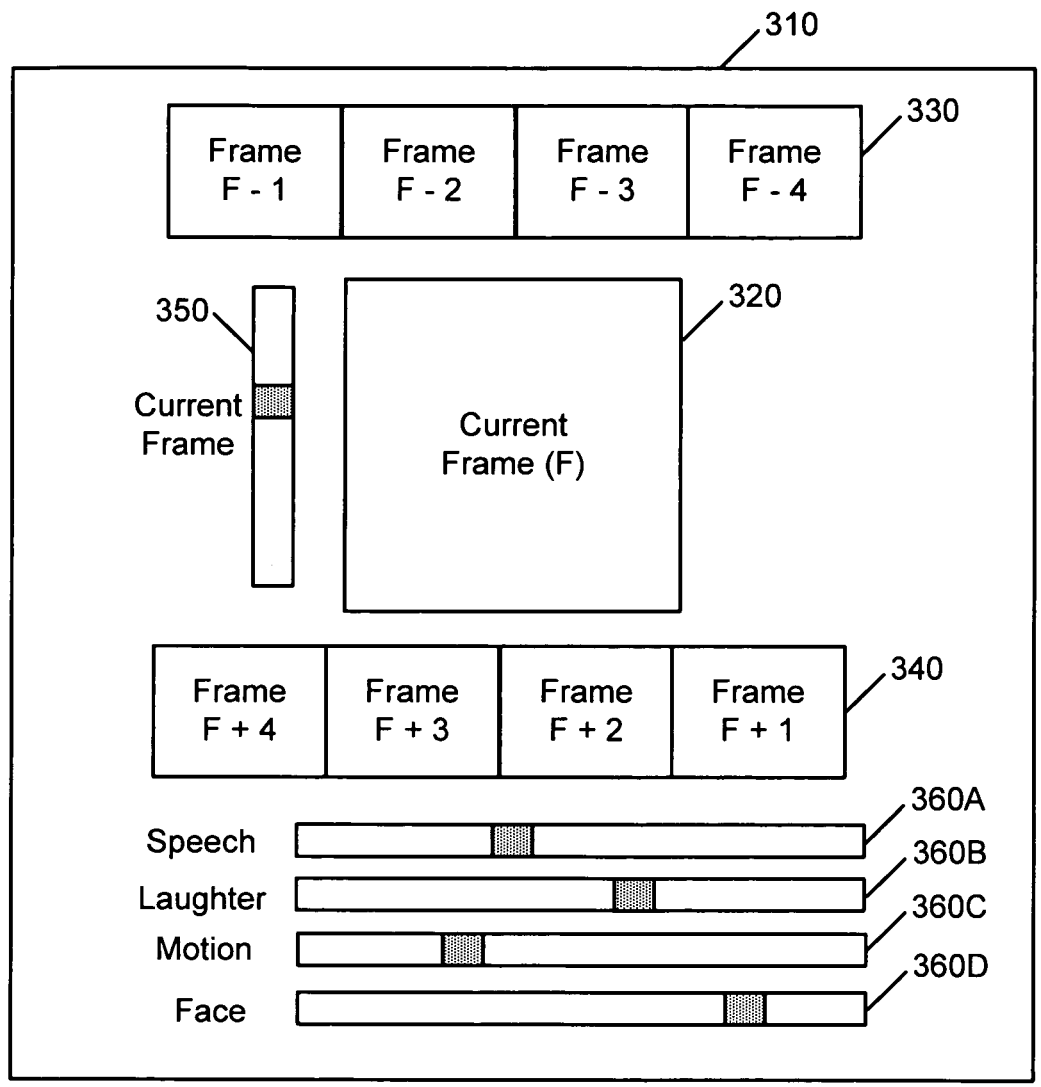
FIG. 3 illustrates an exemplary display screen of an output device.

The user's interaction with the UIM 130, as displayed in an exemplary display screen, is illustrated in FIG. 3. In this exemplary embodiment, the user may dynamically change the final score assigned to a frame currently being played by adjusting slide bar 350 (e.g., moving the indicator button up or down). The user may change the weight of individual video analysis techniques by adjusting one or more slide bars 360A-360D (e.g., moving one or more indicator buttons right or left). Of course, the slide bars 350, 360 illustrated in FIG. 3 are merely exemplary. One skilled in the art will recognize that other representations and control selections may also be implemented. For example, the final scores for any past or future frames may also be adjustable, other video analysis techniques besides those illustrated in FIG. 3 may also be included, and other means for adjustment (e.g., dials, voice recognition, optical sensor, etc.) may be implemented.

In an exemplary implementation, an input device (e.g., a computer mouse, a keyboard, a remote control keypad, a jog wheel, a microphone, etc.) may be used by the user to adjust the control graphic (e.g., slide bars) displayed on the display screen. In another exemplary implementation, the display screen may be enabled by touch screen technology known in the art, whereby the user may directly provide input by touching the display screen. The user input is received by the UIM 130 and provided to the VPM 120 for adjusting the default variable playback speed accordingly. This will be described in greater detail in Section V below.

FIG. 3 also illustrates sliding windows 330 and 340 for displaying a number of past and future frames of the digital video relative to the frame currently being played in the main window 320. As the video plays in the main window 320, time-shifted versions of the video also play in the display of past (time-delayed) and future (time-advanced) frame windows, 330 and 340. The past and future frame windows may be useful to a user viewing the digital video at a higher than normal playing speed, for example, by reminding the user of what has already occurred, or what will next occur, relative to the current frame window. For example, the user may select and jump to any past or future frames. In an exemplary implementation, if the user selects a past or future frame, the UIM 130 will display the selected frame in the current frame window. The sliding windows 330 and 340 illustrated in FIG. 3 are merely exemplary. One skilled in the art will recognize that other implementations for displaying past or future frames may be implemented in accordance with design choice.

Figure 4:
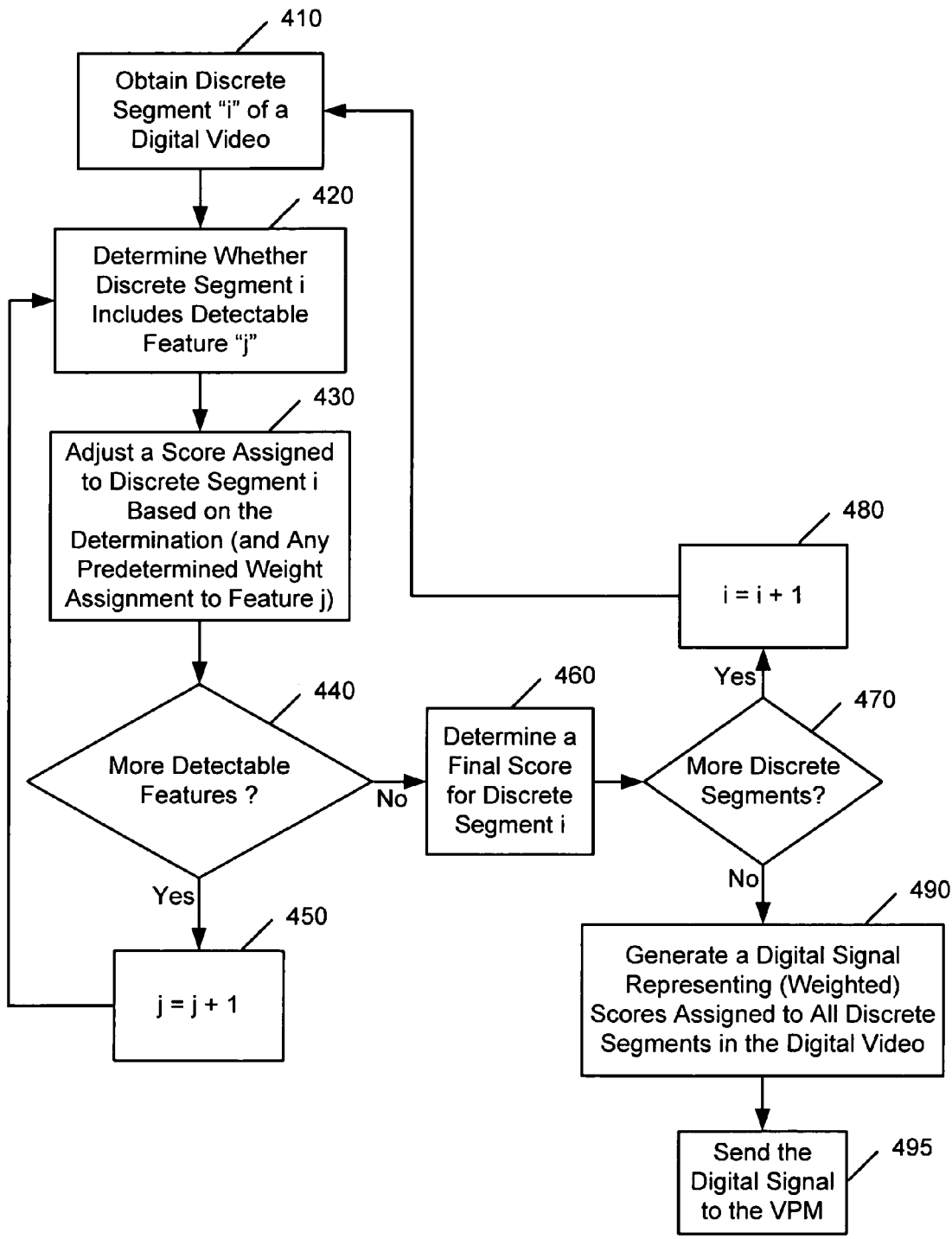
FIG. 4 illustrates an exemplary process for generating a digital signal representing scores for discrete segments of a digital video.

III. An Exemplary Process for Generating a Digital Signal Representing Scores for Discrete Segments of a Digital Video FIG. 4 illustrates an exemplary process for generating a digital signal representing final scores for discrete segments of a digital video. In an exemplary implementation, the process illustrated in FIG. 4 is performed by the VAM 110.

At step 410, a first discrete segment, i, of a digital video to be analyzed is obtained. In an exemplary implementation, the discrete segment is a frame of the digital video.

At step 420, whether the discrete segment i includes a detectable feature j is determined. For example, if detectable feature j is speech, then a voice recognition algorithm may be executed to check for the presence of speech in discrete segment i. Other features detectable by one or more video analysis techniques, include, without limitation, laughter, faces, motion, etc.

At step 430, a score assigned to discrete segment i is adjusted based on the determination at step 420. For example, if speech is detected in discrete segment i, then a value of +1 could be added to a score previously assigned to the discrete segment. If a score has not yet been assigned to the discrete segment i, then a first score is assigned based on the determination at step 420. In another implementation, each discrete segment may initially be assigned a base score, such as 0. Alternatively, at step 430, if the detected feature j has a predetermined weight, a multiplier representing that weight could be applied to the incremental or final score.

At step 440, whether there are more detectable features to be analyzed is determined. For example, one may wish to determine whether the discrete segment i includes any laughter, face, motion, and/or other features.

If there are more detectable features, at step 450, j=j+1 and the next detectable feature is determined at step 420.

If there are no other detectable features, at step 460, the final score for discrete segment i is determined.

Next, at step 470, whether any more discrete segments remain to be analyzed in the digital video is determined.

If there is any remaining discrete segment, at step 480, i=i+1 and control is passed back to step 410 for the next discrete segment i to be obtained.

If there is no remaining discrete segment for the digital video, at step 490, a digital signal representing the final scores assigned to all the discrete segments in the digital video is generated. In an exemplary implementation, an interpolation, smoothing, or other signal generating techniques (e.g., the Gaussian filtering technique) known in the art may be implemented. In an exemplary implementation, optionally and prior to generating the digital signal, the VAM 110 may determine whether to adjust the scores corresponding to one or more detectable features. For example, if a detectable feature (e.g., speech) is present in a majority of discrete segments, the weight of that detectable feature may be reduced in the final scores for the discrete segments. Alternatively, if a detectable feature strongly differentiates among the segments, the weight of that feature may be increased.

At step 495, the generated digital signal is sent to the VPM 120 for providing a default variable speed playback.

IV. An Exemplary Process for Providing Variable Speed Video Playback of a Digital Video FIG. 5 illustrates an exemplary process for providing a default variable speed video playback of a digital video.

At step 510, a digital video is loaded by the playback device (which could be VPM 120, or another device not shown in the Figure).

At step 520, a digital signal representing final scores for discrete segments of a digital video is received by the VPM 120 from the VAM 110.

At step 530, a frame counter i is initialized to 1.

At step 540, the VPM 120 determines the score for the segment corresponding to frame i: score(i). This score will be used to compute a system-determined (i.e., default) variable playback speed for frame i, such that segments in the digital video having relatively higher scores are played at a slower rate, and segments in the digital video having relatively lower scores are played at a faster rate.

At step 550, in this exemplary implementation, the instantaneous default (i.e., system-determined) variable playback rate is determined by the VPM on a frame-by-frame (or segment-by-segment) basis for frame (or segment) i as:

$$\text{Instantaneous playback rate }(i)=\text{Normal playback rate}/\text{Score }(i)$$

where the normal playback rate is the constant playback rate used for the particular video application (e.g., 30 frames per second), and score (i) is the default score for frame (or segment) i, as previously computed by VAM 110.

At step 560, this instantaneous playback rate is sent to the playback device for use in displaying frame i.

At step 570, the VPM determines if any frames remain. If no, the VPM ends the playback.

If yes, at step 580, the VPM advances to the next frame, i+1, and returns control to step 540 to compute the variable playback speed for the new frame.

In the foregoing exemplary implementation, the instantaneous playback rate for each frame is computed, and sent to the playback device, as the video is being played by the playback device. Alternatively, the playback rates for all of the frames can be computed and stored in a file, which is then sent to the playback device in advance of playback.

The default (i.e., system-determined) variable playback speed may further be modified by a user either during playback or prior to playback, as shown in Section V below.

V. An Exemplary Process for Changing Variable Playback Speed in Response to a User Input FIG. 6 illustrates an exemplary process for dynamically changing a variable playback speed in response to a user input.

At step 610, a digital video is loaded by the playback device (which could be VPM 120, or another device not shown in the Figure).

At step 620, a digital signal representing final scores for discrete segments of a digital video is received by the VPM 120 from VAM 110.

At step 630, a frame counter i is initialized to 1.

At step 640, the VPM 120 determines the score for the segment corresponding to frame i: score(i).

At step 650, the VPM 120 loads the user's input to override the system-determined variable playback speed of frame i. In this exemplary implementation, the user input is represented by a value R(i), as will be described below.

At step 660, in this exemplary implementation, the instantaneous user-determined variable playback rate is determined by the VPM on a frame-by-frame (or segment-by-segment) basis for frame (or segment) i as:

$$\text{Instantaneous playback rate}(i)=\text{Normal playback rate}*[1+R(i)*((1-\text{score}(i))/\text{score}(i))]$$

where R(i) is the user's input to change the default speed for frame(i), and score(i) is the default score for frame(i) assigned previously (e.g., by the VAM 110). In this example, a user may control the relative weight given to a particular segment by changing the value of R.

In this exemplary implementation, when R is equal to 1, the default variable playback speed is applied. When R is less than 1, the system's default determination that there exist features of interest is dampened, i.e., the variable playback speed is increased relative to its default value. When R is greater than 1, the system's default determination that there exist features of interest is amplified, i.e., the variable playback speed is decreased relative to its default value. One skilled in the art will recognize that other mathematical calculations known in the art may be applied to recalculate the playback speed based on the user input.

At step 670, this instantaneous playback rate is sent to the playback device for use in displaying frame i.

At step 680, the VPM determines if any frames remain. If no, the VPM ends the playback.

If yes, at step 690, the VPM advances to the next frame, i+1, and returns control to step 640 to compute the variable playback speed for the new frame.

In general, the user has control over the playback speed of discrete segments or the entire video by adjusting final scores assigned to certain segments as well as the weight given to one or more video analysis techniques. The specific controls described herein are merely illustrative. One skilled in the art will recognize that adjustment to other aspects of the digital videos may also be implemented in accordance to system requirement or design choice. Any changes made may affect the entire video being played or only affect subsequent segments (if the video is already being played), depending on design choice.

VI. Other Aspects and Considerations

In an exemplary implementation, a user may have control to partially or completely reverse the default variable playback speeds. For example, the user may slow down segments of the digital video having a low score and/or speed up segments having a high score. In one implementation, additional slide bars (and/or other mechanisms) may be provided by the UIM 130 to enable such user control.

VII. An Exemplary Computing Environment

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

VII. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A method comprising:
   determining a score for each segment of a plurality of segments of a digital video, where the score of at least one of the segments differs from the score of at least another of the segments;
   for each segment of the digital video,
      playing back the segment at a playback speed in accordance with the score of the segment;
      permitting a user to adjust the playback speed by permitting the user to adjust the score of the segment; and,
      where the user adjusts the score of the segment, adjusting the playback speed at which the segment is being played back in accordance with the score of the segment as has been adjusted by the user,
      wherein permitting the user to adjust the score of the segment comprises permitting the user to directly set an average playback speed at which the segments are played back, such that regardless of the playback speed at which any segment of the plurality of segments is played back, a total playback time at which the digital video is played back remains constant.

2. The method of claim 1, wherein determining the score for each segment comprises applying a plurality of video analysis techniques to the segment.

3. The method of claim 2, wherein applying the video analysis techniques to the segment comprises applying each video analysis technique to the segment to yield a sub-score for the video analysis technique for the segment,
   and wherein determining the score for each segment further comprises weighting the sub-score for each video analysis technique for the segment by a predetermined weight assigned to the video analysis technique, such that the score for the segment is based on the sub-scores for the video analysis techniques for the segment as weighted by the predetermined weights assigned to the video analysis techniques.

4. The method of claim 3, wherein determining the score for each segment further comprises determining the predetermined weights assigned to the video analysis technique before applying the video analysis techniques to the segment.

5. The method of claim 3, wherein determining the score for each segment further comprises determining the predetermined weights assigned to the video analysis technique after applying the video analysis techniques to the segment.

6. The method of claim 3, wherein determining the score for each segment further comprises, where a given video analysis technique of the plurality of video analysis techniques fails to substantially provide different sub-scores for different segments, decreasing the predetermined weight assigned to the given video analysis technique.

7. The method of claim 3, wherein determining the score for each segment further comprises, where a given video analysis technique of the plurality of video analysis techniques substantially provides different sub-scores for different segments, increasing the predetermined weight assigned to the given video analysis technique.

8. The method of claim 3, wherein permitting the user to adjust the score of the segment comprises permitting the user to adjust the predetermined weight assigned to at least one of the plurality of video analysis techniques.

9. The method of claim 1, wherein playing back the segment at the playback speed in accordance with the score of the segment comprises increasing the playback speed at which the segment is played back where the score of the segment is low relative to the scores of other segments of the plurality of segments.

10. The method of claim 1, wherein playing back the segment at the playback speed in accordance with the score of the segment comprises decreasing the playback speed at which the segment is played back where the score of the segment is high relative to the scores of other segments of the plurality of segments.

11. The method of claim 1, further comprising, for each segment of the digital video, determining the playback speed in accordance with the score of the segment,
   wherein adjusting the playback speed comprises redetermining the playback speed.

12. The method of claim 1, wherein permitting the user to adjust the playback speed comprises permitting the user to set a maximum playback speed.

13. The method of claim 1, in which permitting the user to adjust the score of the segment further comprises permitting the user to amplify or dampen an effect of the score of the segment on the playback speed at which the segment is played back, such that the score still has an effect on the playback speed at which the segment is played back.

14. A system comprising:
   a video playback module to:
      determine a score for each segment of a plurality of segments of a digital video, where the score of at least one of the segments differs from the score of at least another of the segments;
      for each segment of the digital video,
         play back the segment at a playback speed in accordance with the score of the segment;
         permit a user to adjust the playback speed by permitting the user to adjust the score of the segment; and,
         where the user adjusts the score of the segment, adjust the playback speed at which the segment is being played back in accordance with the score of the segment as has been adjusted by the user; and,
   a user interface module to provide input from the user to the video playback module,
   wherein the video playback module is to permit the user to adjust the score of the segment by
      permitting the user to directly set an average playback speed at which the segments are played back, such that regardless of the playback speed at which any segment of the plurality of segments is played back, a total playback time at which the digital video is played back remains constant.

15. The system of claim 14, wherein the video playback module is to determine the score for each segment by applying a plurality of video analysis techniques to the segment.

16. The system of claim 15, wherein the video playback module is to apply the video analysis techniques to the segment by applying each video analysis technique to the segment to yield a sub-score for the video analysis technique for the segment,
   and wherein the video playback module is to determine the score for each segment by also weighting the sub-score for each video analysis technique for the segment by a predetermined weight assigned to the video analysis technique, such that the score for the segment is based on the sub-scores for the video analysis techniques for the segment as weighted by the predetermined weights assigned to the video analysis techniques.

17. The system of claim 16, wherein the video playback module is to determine the score for each segment by also determining the predetermined weights assigned to the video analysis technique before applying the video analysis techniques to the segment.

18. The system of claim 16, wherein the video playback module is to determine the score for each segment by also determining the predetermined weights assigned to the video analysis technique after applying the video analysis techniques to the segment.

19. The system of claim 16, wherein the video playback module is to determine the score for each segment by also, where a given video analysis technique of the plurality of video analysis techniques fails to substantially provide different sub-scores for different segments, decreasing the predetermined weight assigned to the given video analysis technique.

20. The system of claim 16, wherein the video playback module is to determine the score for each segment by also, where a given video analysis technique of the plurality of video analysis techniques substantially provides different sub-scores for different segments, increasing the predetermined weight assigned to the given video analysis technique.

21. The system of claim 14, wherein the video playback module is to permit the user to adjust the score of the segment by permitting the user to adjust the predetermined weight assigned to at least one of the plurality of video analysis techniques.

22. The system of claim 14, wherein the video playback module is to play back the segment at the playback speed in accordance with the score of the segment by increasing the playback speed at which the segment is played back where the score of the segment is low relative to the scores of other segments of the plurality of segments.

23. The system of claim 14, wherein the video playback module is to play back the segment at the playback speed in accordance with the score of the segment by decreasing the playback speed at which the segment is played back where the score of the segment is high relative to the scores of other segments of the plurality of segments.

24. The system of claim 14, wherein the video playback module is to further, for each segment of the digital video, determine the playback speed in accordance with the score of the segment,
wherein the video playback module is to adjust the playback speed by redetermining the playback speed.

25. The system of claim 14, wherein the video playback module is to permit the user to adjust the score of the segment by permitting the user to set a maximum playback speed.

26. The system of claim 14, in which the video playback module permits the user to adjust the score of the segment by further permitting the user to amplify or dampen an effect of the score of the segment on the playback speed at which the segment is played back, such that the score still has an effect on the playback speed at which the segment is played back.

27. A non-transitory computer-readable data storage medium storing a computer program executable by a processor to perform a method comprising:
determining a score for each segment of a plurality of segments of a digital video, where the score of at least one of the segments differs from the score of at least another of the segments;
for each segment of the digital video,
playing back the segment at a playback speed in accordance with the score of the segment;
permitting a user to adjust the playback speed by permitting the user to adjust the score of the segment; and,
where the user adjusts the score of the segment, adjusting the playback speed at which the segment is being played back in accordance with the score of the segment as has been adjusted by the user,
wherein permitting the user to adjust the score of the segment comprises
permitting the user to directly set an average playback speed at which the segments are played back, such that regardless of the playback speed at which any segment of the plurality of segments is played back, a total playback time at which the digital video is played back remains constant.

28. The medium of claim 27, wherein determining the score for each segment comprises applying a plurality of video analysis techniques to the segment.

29. The medium of claim 28, wherein applying the video analysis techniques to the segment comprises applying each video analysis technique to the segment to yield a sub-score for the video analysis technique for the segment,
and wherein determining the score for each segment further comprises weighting the sub-score for each video analysis technique for the segment by a predetermined weight assigned to the video analysis technique, such that the score for the segment is based on the sub-scores for the video analysis techniques for the segment as weighted by the predetermined weights assigned to the video analysis techniques.

30. The medium of claim 29, wherein determining the score for each segment further comprises determining the predetermined weights assigned to the video analysis technique before applying the video analysis techniques to the segment.

31. The medium of claim 29, wherein determining the score for each segment further comprises determining the predetermined weights assigned to the video analysis technique after applying the video analysis techniques to the segment.

32. The medium of claim 29, wherein determining the score for each segment further comprises, where a given video analysis technique of the plurality of video analysis techniques fails to substantially provide different sub-scores for different segments, decreasing the predetermined weight assigned to the given video analysis technique.

33. The medium of claim 29, wherein determining the score for each segment further comprises, where a given video analysis technique of the plurality of video analysis techniques substantially provides different sub-scores for different segments, increasing the predetermined weight assigned to the given video analysis technique.

34. The medium of claim 29, wherein permitting the user to adjust the score of the segment comprises permitting the user to adjust the predetermined weight assigned to at least one of the plurality of video analysis techniques.

35. The medium of claim 27, wherein playing back the segment at the playback speed in accordance with the score of the segment comprises increasing the playback speed at which the segment is played back where the score of the segment is low relative to the scores of other segments of the plurality of segments.

36. The medium of claim 27, wherein playing back the segment at the playback speed in accordance with the score of the segment comprises decreasing the playback speed at which the segment is played back where the score of the segment is high relative to the scores of other segments of the plurality of segments.

37. The medium of claim 27, wherein the method further comprises, for each segment of the digital video, determining the playback speed in accordance with the score of the segment,
  wherein adjusting the playback speed comprises redetermining the playback speed.

38. The medium of claim 27, wherein permitting the user to adjust the playback speed comprises permitting the user to set a maximum playback speed.

39. The medium of claim 27, in which permitting the user to adjust the score of the segment further comprises permitting the user to amplify or dampen an effect of the score of the segment on the playback speed at which the segment is played back, such that the score still has an effect on the playback speed at which the segment is played back.

* * * * *